US009923659B2

United States Patent
Kang et al.

(10) Patent No.: US 9,923,659 B2
(45) Date of Patent: Mar. 20, 2018

(54) METHOD AND APPARATUS FOR SEARCHING CONTROL INFORMATION BY TERMINAL IN MULTINODE SYSTEM

(75) Inventors: Ji Won Kang, Anyang-si (KR); Bin Chul Ihm, Anyang-si (KR); Su Nam Kim, Anyang-si (KR); Jin Young Chun, Anyang-si (KR); Sung Ho Park, Anyang-si (KR); Ki Tae Kim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 58 days.

(21) Appl. No.: 14/002,566

(22) PCT Filed: Dec. 19, 2011

(86) PCT No.: PCT/KR2011/009811
§ 371 (c)(1),
(2), (4) Date: Sep. 19, 2013

(87) PCT Pub. No.: WO2012/118269
PCT Pub. Date: Sep. 7, 2012

(65) Prior Publication Data
US 2014/0003349 A1  Jan. 2, 2014

Related U.S. Application Data

(60) Provisional application No. 61/448,146, filed on Mar. 1, 2011, provisional application No. 61/475,201, filed on Apr. 13, 2011.

(51) Int. Cl.
*H04W 72/14* (2009.01)
*H04J 11/00* (2006.01)
(Continued)

(52) U.S. Cl.
CPC ........ *H04J 11/0083* (2013.01); *H04L 1/0046* (2013.01); *H04L 5/0053* (2013.01);
(Continued)

(58) Field of Classification Search
None
See application file for complete search history.

(56) References Cited

U.S. PATENT DOCUMENTS

2006/0062237 A1  3/2006  Kim
2009/0274077 A1  11/2009  Meylan et al.
(Continued)

FOREIGN PATENT DOCUMENTS

CN  101600206 A  12/2009
EP  2372927 A2  10/2011
(Continued)

OTHER PUBLICATIONS

"3rd Generation Partnership Project; Technical Specification Group Radio Access Network; Evolved Universal Terrestrial Radio Access (E-UTRA); Physical layer procedures (Release 8)," 3GPP TS 36.213 V8.3.0, May 2008, pp. 1-45, R2-121016.
(Continued)

*Primary Examiner* — Jae Y Lee
*Assistant Examiner* — Aixa Guadalupe-Cruz
(74) *Attorney, Agent, or Firm* — Birch, Stewart, Kolasch & Birch, LLP

(57) ABSTRACT

Provided is a method of searching for control information of a user equipment (UE) in a multi-node system including a plurality of nodes and a base station connected to each of the plurality of nodes and capable of controlling the nodes. The method includes: receiving search space indication information from the base station; and searching for the control information in a radio resource region indicated by the search space indication information, wherein the search
(Continued)

space indication information indicates any one of a first search space and a second search space.

4 Claims, 12 Drawing Sheets

(51) Int. Cl.
H04L 5/00 (2006.01)
H04W 72/04 (2009.01)
H04L 1/00 (2006.01)
H04W 72/08 (2009.01)

(52) U.S. Cl.
CPC ......... *H04L 5/0091* (2013.01); *H04W 72/042* (2013.01); *H04W 72/14* (2013.01); *H04W 72/08* (2013.01)

(56) References Cited

U.S. PATENT DOCUMENTS

| | | | |
|---|---|---|---|
| 2010/0279689 A1 | 11/2010 | Tinnakornsrisuphap et al. | |
| 2010/0296473 A1 | 11/2010 | Kim et al. | |
| 2010/0302983 A1 | 12/2010 | McBeath et al. | |
| 2011/0038275 A1* | 2/2011 | Kim | H04W 48/16 370/252 |
| 2011/0075624 A1* | 3/2011 | Papasakellariou | H04L 5/0053 370/329 |
| 2011/0170496 A1* | 7/2011 | Fong | H04L 5/0053 370/329 |
| 2011/0194412 A1 | 8/2011 | Park et al. | |
| 2011/0243090 A1* | 10/2011 | Grovlen | H04L 1/18 370/329 |
| 2012/0078933 A1 | 3/2012 | Kim et al. | |
| 2012/0207099 A1* | 8/2012 | Lindh | H04L 5/0057 370/329 |
| 2013/0094383 A1 | 4/2013 | Lin | |

FOREIGN PATENT DOCUMENTS

| | | |
|---|---|---|
| JP | 2012-503922 A | 2/2012 |
| JP | 2013-522964 A | 6/2013 |
| JP | 2014-508471 A | 4/2014 |
| KR | 10-2007-0046856 A | 5/2007 |
| KR | 10-2009-0086039 A | 8/2009 |
| WO | WO 2010/074530 A2 | 7/2010 |
| WO | WO 2010/039003 A2 | 8/2010 |
| WO | WO 2010/131926 A2 | 11/2010 |
| WO | WO 2011/112681 A1 | 9/2011 |
| WO | WO 2012/109542 A1 | 8/2012 |

OTHER PUBLICATIONS

Huawei et al., "Considerations on the ePDCCH design," 3GPP TSG RAN WG1 Meeting #67, Nov. 14-18, 2011, 5 pages, R1-113655.
LG Electronics, "UE Behaviors according to Search Space Configuration," 3GPP TSG RAN WG1 Meeting #67, Nov. 14-18, 2011, pp. 1-2, R1-113993.
Samsung, "PDCCH Extension to Support Operation with CI," 3GPP TSG RAN WG1 #59, Nov. 9-13, 2009, pp. 1-2, R1-094569.

* cited by examiner

METHOD AND APPARATUS FOR SEARCHING CONTROL INFORMATION BY TERMINAL IN MULTINODE SYSTEM

CROSS REFERENCE TO RELATED APPLICATIONS

This application is the National Phase of PCT/KR2011/009811 filed on Dec. 19, 2011, which claims priority under 35 U.S.C. 119(e) to U.S. Provisional Application No. 61/448,146 filed on Mar. 1, 2011 and U.S. Provisional Application No. 61/475,201 filed on Apr. 13, 2011, all of which are hereby expressly incorporated by reference into the present application.

TECHNICAL FIELD

The present invention relates to wireless communications, and more particularly, to a method and apparatus for searching for control information of a user equipment in a multi-node system.

BACKGROUND ART

A data transfer amount of a wireless network has been rapidly increased in recent years. It is because various devices, e.g., a smart phone, a tablet personal computer (PC), or the like, that require machine-to-machine (M2M) communication and a high data transfer amount have been introduced and distributed. To satisfy the required high data transfer amount, a carrier aggregation (CA) technique, a cognitive radio (CR) technique, or the like for effectively using more frequency bands and a multiple antenna technique, a multiple base station cooperation technique, or the like for increasing data capacity within a limited frequency have recently drawn attention.

In addition, the wireless network has been evolved in a direction of increasing density of nodes capable of accessing to an area around a user. Herein, the node implies an antenna (or antenna group) which is separated from a distributed antenna system (DAS) by more than a certain distance. However, the node is not limited to this definition, and thus can also be used in a broader sense. That is, the node may be a macro evolved node B (eNB), a pico-cell eNB (PeNB), a home eNB (HeNB), a remote radio head (RRH), a remote radio unit (RRU), a relay, a distributed antenna (group), etc. A wireless communication system having nodes with higher density can provide higher system performance by cooperation between the nodes. That is, better system performance can be achieved when one base station controller manages transmission and reception of respective nodes and thus the nodes operate as if they are antennas or an antenna group for one cell, in comparison with a case where the respective nodes do not cooperate with each other by operating as an independent base station, etc. Hereinafter, a wireless communication system including a plurality of nodes and a base station for controlling the plurality of nodes is referred to as a multi-node system.

SUMMARY OF INVENTION

Technical Problem

The present invention provides a method and apparatus for searching for control information of a user equipment in a multi-node system.

Technical Solution

According to an aspect of the present invention, a method of searching for control information of a user equipment (UE) in a multi-node system including a plurality of nodes and a base station connected to each of the plurality of nodes and capable of controlling the nodes is provided. The method includes: receiving search space indication information from the base station; and searching for the control information in a radio resource region indicated by the search space indication information, wherein the search space indication information is information which indicates any one of a first search space and a second search space, and wherein the first search space is a radio resource in which a first-type UE operating by a first radio access technology (RAT) searches for control information, the second search space is a radio resource region in which a second-type UE operating by a second RAT searches for control information, and the UE is the second-type UE.

In the aforementioned aspect of the present invention, the first search space may be located in first N orthogonal frequency division multiplexing (OFDM) symbols in a subframe which includes a plurality of OFDM symbols in a time domain and includes a plurality of resource blocks in a frequency domain, and the second search space may be located in at least one OFDM symbol located next to the first search space in the subframe, where N is any one of natural numbers 1 to 4.

In addition, the first search space may include a first common search space and a first UE-specific search space, and the second search space may include only a second UE-specific search space, wherein cell-specific control information which is common to the first-type UE and the second-type UE may be transmitted in the first search space.

In addition, control information which is specific for the second-type UE may be transmitted in any one of search spaces between the first search space and the second UE-specific search space, and the any one of search spaces may be indicated by the search space indication information.

In addition, the search space indication information may be received using a higher layer signal.

In addition, the search space indication information may be included in downlink control channel (DCI) of a physical downlink control channel (PDCCH) transmitted by the base station in the first search space.

According to another aspect of the present invention, a method of searching for control information of a UE in a multi-node system including a plurality of nodes and a base station connected to each of the plurality of nodes and capable of controlling the nodes is provided. The method includes: receiving a UE list from the base station; determining a radio resource region for searching for control information on the basis of the UE list; and searching for the control information in the determined radio resource region, wherein the UE list includes 'information on an E-PDCCH region' indicating a radio resource region for transmitting control information by at least one node among the plurality of nodes or a radio network temporary identifier (RNTI) for the UE which receives control information in the at least one node.

In the aforementioned aspect of the present invention, the determined radio resource region may be determined to any one of a first search space and a second search space, wherein the first search space may be a radio resource in which a first-type UE operating by an RAT searches for control information, the second search space may be a radio resource region in which a second-type UE operating by a second RAT searches for control information, and the UE may be the second-type UE.

In addition, the first search space may be located in first N OFDM symbols in a subframe which includes a plurality of OFDM symbols in a time domain and includes a plurality of resource blocks in a frequency domain, and the second search space may be located in at least one OFDM symbol located next to the first search space in the subframe, where N is any one of natural numbers 1 to 4.

In addition, the first search space may include a first common search space and a first UE-specific search space, and the second search space may include a second common search space and a second UE-specific search space.

In addition, the 'information on the E-PDCCH region' may include information indicating a location and size of the second search space.

In addition, the RNTI may include at least one of: a C-RNTI, Temporary C-RNTI, and Semi-Persistent Scheduling C-RNTI as an identifier of the UE; a TPC-PUCCH-RNTI and TPC-PUSCH-RNTI used for demasking control information on uplink transmit power control; and RA-RNTIs used to transmit a random access response.

In addition, the RNTI may be used in the second common search space.

In addition, if an RNTI of the UE is included in the UE list, UE-specific information of the UE may be received in the second UE-specific search space.

In addition, the UE list may be broadcast from the base station.

According to another aspect of the present invention, there is provided a UE including: a radio frequency (RF) unit for transmitting and receiving a radio signal; and a processor coupled to the RF unit, wherein the processor receives search space indication information from the base station, and searches for the control information in a radio resource region indicated by the search space indication information, wherein the search space indication information is information which indicates any one of a first search space and a second search space, and the first search space is a radio resource in which a first-type UE operating by an RAT searches for control information, the second search space is a radio resource region in which a second-type UE operating by a second RAT searches for control information, and the UE is the second-type UE.

According to another aspect of the present invention, there is provided a UE including: an RF unit for transmitting and receiving a radio signal; and a processor coupled to the RF unit, wherein the processor receives a UE list from the base station, determines a radio resource region for searching for control information on the basis of the UE list, and searches for the control information in the determined radio resource region, wherein the UE list includes 'information on an E-PDCCH region' indicating a radio resource region for transmitting control information by at least one node among the plurality of nodes or an RNTI for the UE which receives control information in the at least one node.

Advantageous Effects

According to the present invention, control information can be effectively transmitted and received by allocating an additional radio resource to control information transmission of a node in a multi-node system. The number of blind decoding attempts can be decreased by reporting a specific radio resource on which the control information is transmitted to a user equipment.

MODE FOR INVENTION

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. IEEE 802.16m is evolved from IEEE 802.16e, and provides backward compatibility with an IEEE 802.16e-based system. The UTRA is a part of a universal mobile telecommunication system (UMTS). $3^{rd}$ generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advance (LTE-A) is evolved from the 3GPP LTE.

Although the following description focuses on an LTE-A system for clarity, the technical features of the present invention are not limited thereto.

Figure 1:
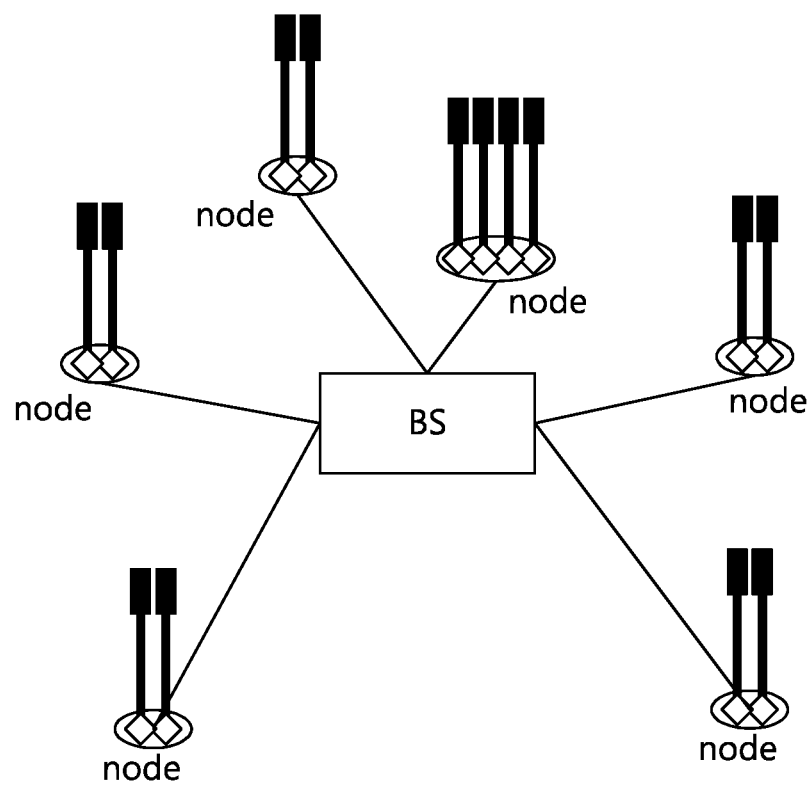
FIG. 1 shows an example of a multi-node system.

FIG. 1 shows an example of a multi-node system.

The multi-node system includes a base station (BS) and a plurality of nodes.

The BS provides a communication service to a specific geographical region. The BS is generally a fixed station that communicates with a user equipment (UE) and may be referred to as another terminology, such as an evolved Node-B (eNB), a base transceiver system (BTS), an advanced base station (ABS), etc.

A distributed antenna is shown in FIG. 1 as an example of a node, and in this sense, the node may be called as an antenna node (AN). However, the node is not limited to the distributed antenna, and thus may be, for example, a macro eNB antenna, a pico-cell eNB (PeNB), a home eNB (HeNB), a remote radio head (RRH), a relay, etc. The node is also called a point. This node may be connected to the BS in a wired or wireless fashion, and may be controlled/managed by the BS.

From the perspective of the UE, the node can be identified or indicated by using a reference signal (RS) or a pilot signal. The RS (or pilot signal, hereinafter, the same is also applied) is a signal known to a transmitting side and a receiving side, and implies a signal used for channel measurement, data demodulation, etc. Examples of the RS include a channel status indication-reference signal (CSI-RS) defined in 3GPP LTE-A and a preamble, midamble, etc., defined in IEEE 802.16m. The RS or a configuration for the RS can be mapped to each node (or a transmit antenna of each node). If the RS configuration and mapping information between nodes are given to the UE or are pre-known to the UE, the UE can identify a node on the basis of a CSI-RS configuration or can be instructed to identify the node, and can obtain channel state information on the node. The RS configuration may include information regarding a configuration index, the number of antenna ports of each node, a resource element (RE) in use, a transmission period, an offset of a transmission time, etc. Therefore, in the present invention, the technique for measuring a signal or generating channel state information with respect to a specific node by the UE may imply measuring of the signal or generating of the channel state information with respect to a specific RS from the perspective of the UE.

Referring back to FIG. 1, the node is connected to the BS in a wired/wireless fashion, and each node may include one antenna or a plurality of antennas (i.e., an antenna group). Antennas belonging to one node may be geographically located within several meters and show the same feature. In the multi-node system, the node serves as an access point (AP) accessible by the UE.

In a case where the node includes the antennas in the multi-node system as described above, it may be called a distributed antenna system (DAS). That is, the DAS is a system in which antennas (i.e., nodes) are deployed in various positions in a geographically distributed manner, and these antennas are managed by the BS. The DAS is different from a conventional centralized antenna system (CAS) in which antennas of the BS are centralized in a cell center.

Herein, if the antennas are deployed in a geographically distributed manner, it may imply that, if one receiver receives the same signal from the plurality of antennas, the antennas are deployed such that a channel state difference between each antenna and the receiver is greater than or equal to a specific value. If the antennas are deployed in a centralized manner, it may imply that the antennas are deployed in a localized manner such that a channel state difference between each antenna and one receiver is less than the specific value. The specific value can be determined variously according to a frequency, service type, etc., used by the antennas.

In general, a downlink implies communication from the BS or the node to the UE, and an uplink implies communication from the UE to the BS or the node.

Figure 2:
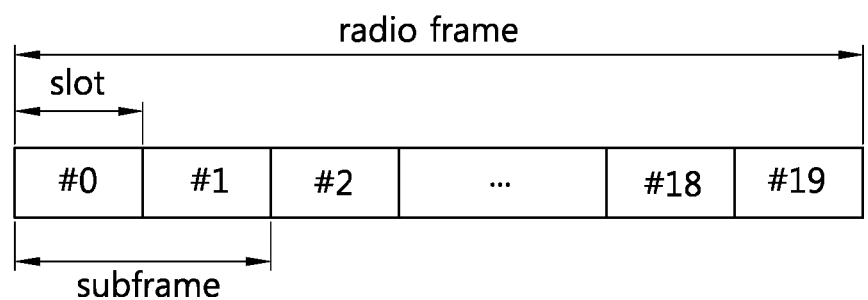
FIG. 2 shows a structure of a radio frame in $3^{rd}$ generation partnership project (3GPP) long term evolution (LTE).

FIG. 2 shows a structure of a radio frame in 3GPP LTE.

Referring to FIG. 2, the radio frame consists of 10 subframes. One subframe consists of two slots. Slots included in the radio frame are numbered with slot numbers #0 to #19. A time required to transmit one subframe is defined as a transmission time interval (TTI). The TTI may be a scheduling unit for data transmission. For example, one radio frame may have a length of 10 milliseconds (ms), one subframe may have a length of 1 ms, and one slot may have a length of 0.5 ms.

The above radio frame structure is shown for exemplary purposes only. Thus, the number of subframes included in the radio frame or the number of slots included in the subframe may change variously.

Figure 3:
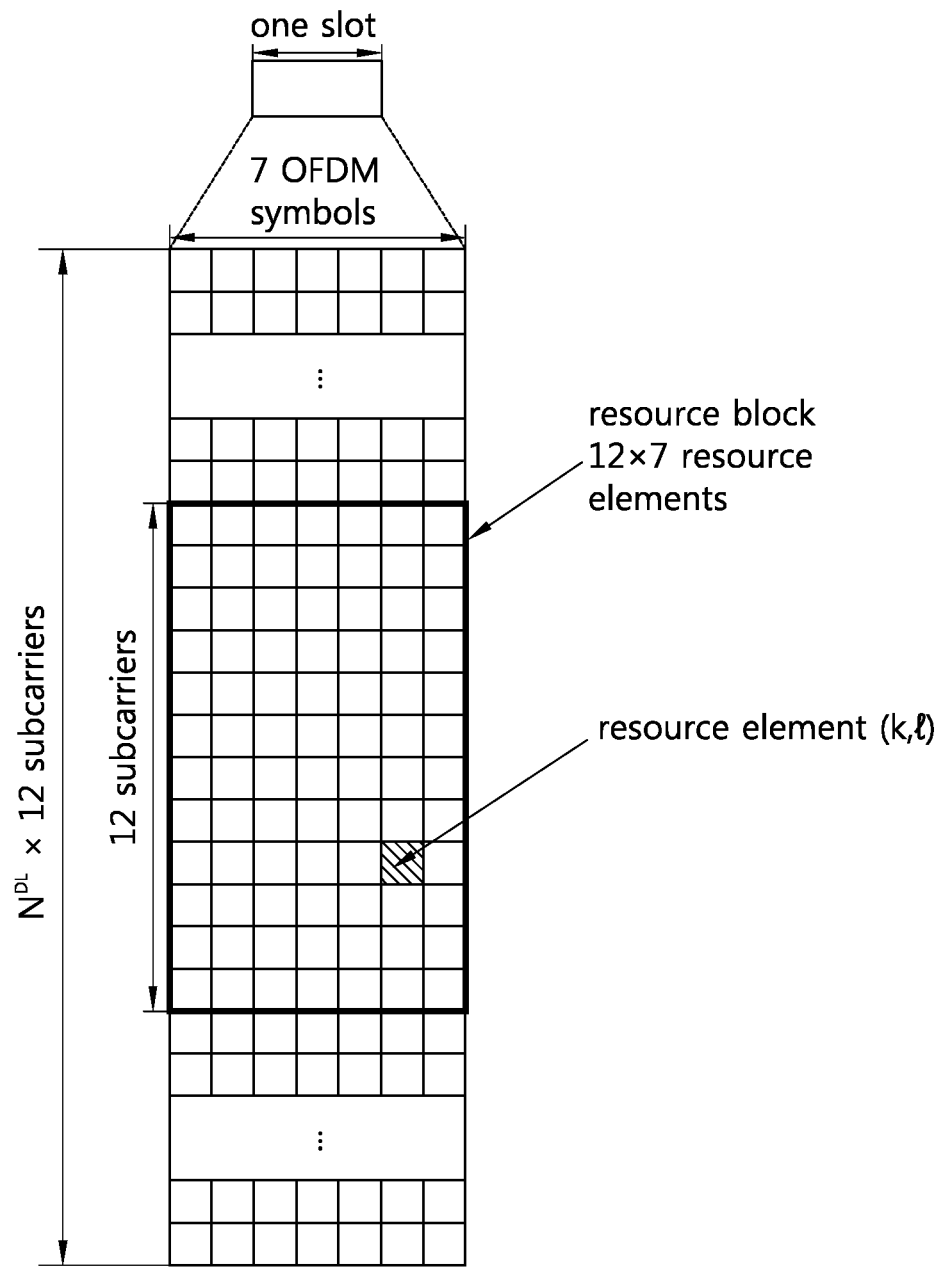
FIG. 3 shows an example of a resource grid for one slot.

FIG. 3 shows an example of a resource grid for one slot.

The slot includes a downlink (DL) slot and an uplink (UL) slot. The DL slot includes a plurality of OFDM symbols in a time domain, and includes $N_{RB}$ resource blocks (RBs) in a frequency domain. The OFDM symbol may also be referred to as an SC-FDMA symbol according to a transmission scheme. The RB is a resource allocation unit, and includes one slot in the time domain and includes a plurality of subcarriers in the frequency domain.

The number $N_{RB}$ of RBs included in the DL slot depends on a DL transmission bandwidth configured in a cell. For example, in the LTE system, $N_{RB}$ may be any one value in the range of 6 to 110. A structure of a UL slot may be the same as the aforementioned structure of the DL slot.

Each element on the resource grid is referred to as a resource element (RE). The RE on the resource grid can be identified by an index pair (k,l) within the slot. Herein, k (k=0, . . . , $N_{RB} \times 12-1$) denotes a subcarrier index in the frequency domain, and l (l=0, . . . , 6) denotes an OFDM symbol index in the time domain.

Although it is described herein that one resource block includes 7×12 REs consisting of 7 OFDM symbols in the time domain and 12 subcarriers in the frequency domain for example, the number of OFDM symbols and the number of subcarriers in the resource block are not limited thereto. Thus, the number of OFDM symbols and the number of subcarriers may change variously depending on a CP length, a frequency spacing, etc. For example, the number of OFDM symbols is 7 in a normal CP case, and the number of OFDM symbols is 6 in an extended CP case. The number of subcarriers in one OFDM symbol may be selected from 128, 256, 512, 1024, 1536, and 2048.

Figure 4:
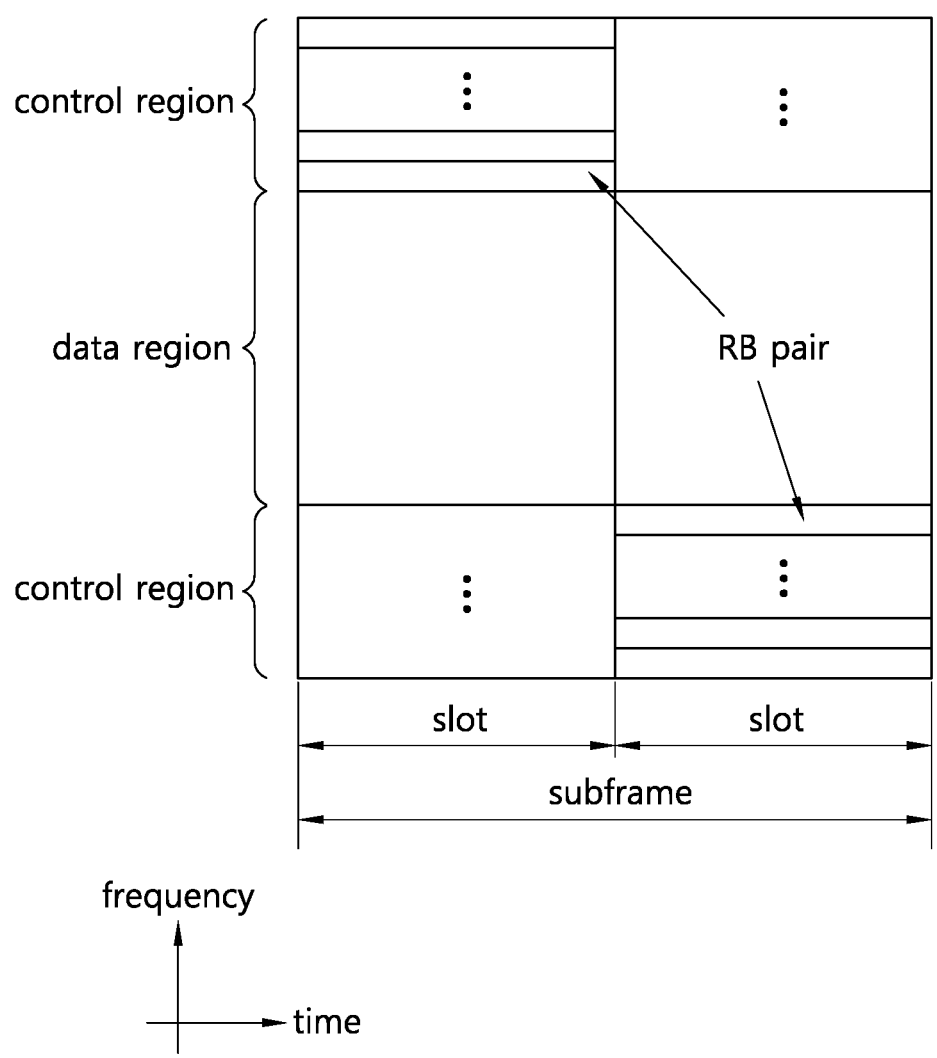
FIG. 4 shows a structure of an uplink (UL) subframe.

FIG. 4 shows a structure of a UL subframe.

The UL subframe can be divided into a control region and a data region. A physical uplink control channel (PUCCH) for carrying uplink control information is allocated to the control region. A physical uplink shared channel (PUSCH) for carrying data is allocated to the data region. A UE may (or may not) simultaneously transmit the PUCCH and the PUSCH.

The PUCCH for one UE is allocated in an RB pair in a subframe. RBs belonging to the RB pair occupy different subcarriers in each of a $1^{st}$ slot and a $2^{nd}$ slot. A frequency occupied by the RBs belonging to the RB pair changes at a slot boundary. This is called that the RB pair allocated to the PUCCH is frequency-hopped at the slot boundary. Since the UE transmits the uplink control information on a time basis through different subcarriers, a frequency diversity gain can be obtained.

Examples of uplink control information transmitted on a PUCCH include Hybrid Automatic Repeat reQuest (HARQ), Acknowledgement (ACK)/Non-acknowledgement (NACK), Channel State Information (CSI) indicating a DL channel state, Scheduling Request (SR) which is a UL radio resource allocation request, etc. Examples of CSI include a precoding matrix index (PMI) indicating a precoding matrix, a rank indicator (RI) indicating a rank value preferred by the UE, a channel quality indicator (CQI) indicating a channel state, etc.

The PUSCH is mapped to an uplink shared channel (UL-SCH) which is a transport channel. UL data transmitted through the PUSCH may be a transport block which is a data block for the UL-SCH transmitted during a TTI. The transport block may be user information. Alternatively, the UL data may be multiplexed data. The multiplexed data may be obtained by multiplexing control information and a transport block for the UL-SCH. Examples of the control information multiplexed to the data may include CQI, PMI, HARQ ACK/NACK, RI, etc. Alternatively, the UL data may consist of only the control information.

Figure 5:
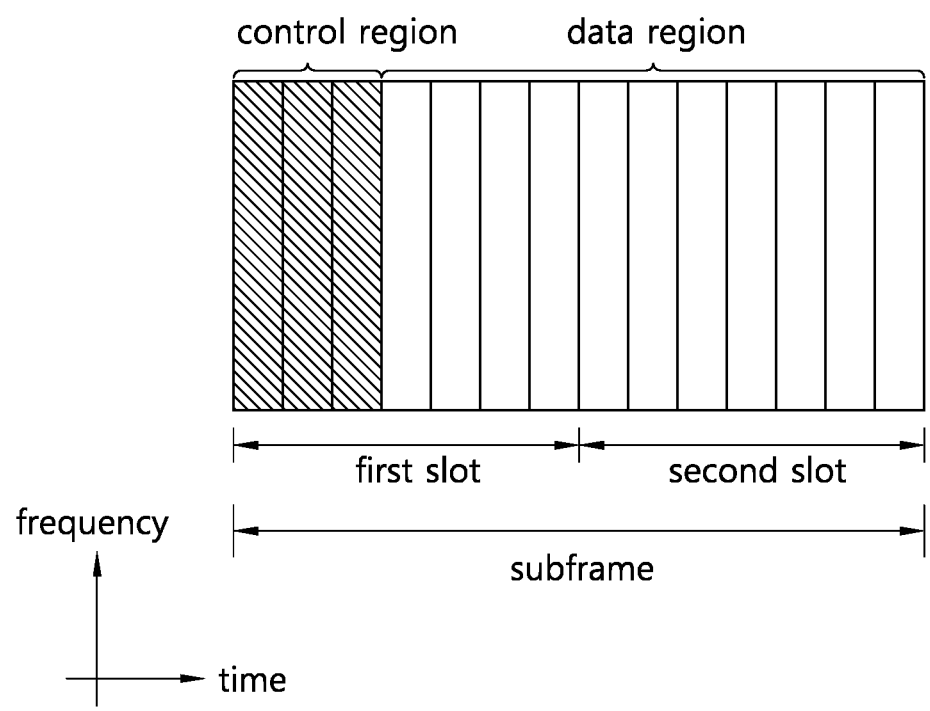
FIG. 5 shows a structure of a downlink (DL) subframe.

FIG. 5 shows a structure of a DL subframe.

The DL subframe includes two slots in a time domain. Each slot includes 7 OFDM symbols in a normal CP case. Up to three OFDM symbols (i.e., in case of 1.4 MHz bandwidth, up to 4 OFDM symbols) located in a front portion of a first slot within the subframe correspond to a control region, and the remaining OFDM symbols correspond to a data region. Herein, control channels are allocated to the control region, and a physical downlink shared channel (PDSCH) is allocated to the data region. The PDSCH implies a channel for transmitting data from a BS or a node to a UE.

Examples of a control channel transmitted in the control region include a physical control format indicator channel (PCFICH), a physical hybrid-ARQ indicator channel (PHICH), and a physical downlink control channel (PDCCH).

The PCFICH transmitted in a $1^{st}$ OFDM symbol of the subframe carries a control format indicator (CFI) as information regarding the number of OFDM symbols (i.e., a size of the control region) used for transmission of control channels in the subframe. The UE first receives the CFI on the PCFICH, and thereafter monitors the PDCCH. Unlike the PDCCH, the PCFICH does not use blind decoding, and is transmitted by using a fixed PCFICH resource of the subframe.

The PHICH carries a positive-acknowledgement (ACK)/negative-acknowledgement (NACK) signal for a UL hybrid automatic repeat request (HARQ). The ACK/NACK signal for UL data on a PUSCH transmitted by the UE is transmitted on the PHICH.

Control information transmitted through the PDCCH is referred to as downlink control information (DCI). The DCI may include resource allocation of the PDSCH (this is referred to as a DL grant), resource allocation of a PUSCH (this is referred to as a UL grant), a set of transmit power control commands for individual UEs in any UE group, and/or activation of a voice over Internet protocol (VoIP).

Figure 6:
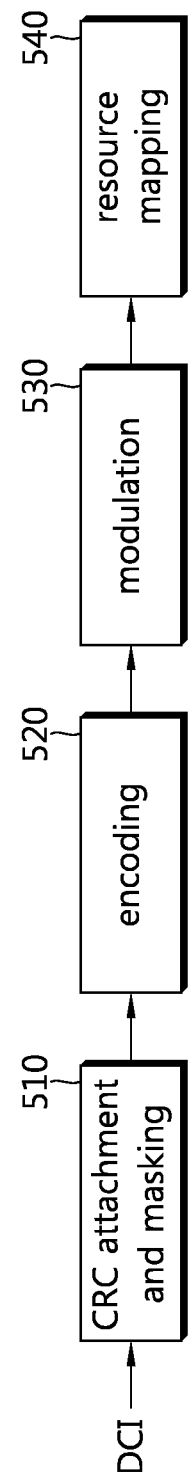
FIG. 6 is a block diagram showing a process of generating a physical downlink control channel (PDCCH).

FIG. 6 is a block diagram showing a process of generating a PDCCH.

A BS determines a PDCCH format according to DCI to be transmitted to a UE, attaches a cyclic redundancy check (CRC) to the DCI, and masks a unique identifier (referred to as a radio network temporary identifier (RNTI)) to the CRC according to an owner or usage of the PDCCH (step 510).

Table 1 below shows a type of RNTI.

TABLE 1

| RNTI | Usage | Transport Channel | Logical Channel |
|---|---|---|---|
| P-RNTI | Paging and System Information change notification | PCH | PCCH |
| SI-RNTI | Broadcast of System Information | DL-SCH | BCCH |

TABLE 1-continued

| RNTI | Usage | Transport Channel | Logical Channel |
|---|---|---|---|
| M-RNTI | MCCH Information change notification | N/A | N/A |
| RA-RNTI | Random Access Response | DL-SCH | N/A |
| Temporary C-RNTI | Contention Resolution, when no valid C-RNTI is available) | DL-SCH | CCCH |
| Temporary C-RNTI | Msg3 transmission | UL-SCH | CCCH, DCCH, DTCH |
| C-RNTI | Dynamically scheduled unicast transmission | UL-SCH | DCCH, DTCH |
| C-RNTI | Dynamically scheduled unicast transmission | DL-SCH | CCCH, DCCH, DTCH |
| C-RNTI | Triggering of PDCCH ordered random access | N/A | N/A |
| Semi-Persistent Scheduling C-RNTI | Semi-Persistently scheduled unicast transmission, activation, reactivation and retransmission | DL-SCH, UL-SCH | DCCH, DTCH |
| Semi-Persistent Scheduling C-RNTI | Semi-Persistently scheduled unicast transmission, deactivation | N/A | N/A |
| TPC-PUCCH-RNTI | Physical layer Uplink power control | N/A | N/A |
| TPC-PUSCH-RNTI | Physical layer Uplink power control | N/A | N/A |

Table 2 shows a range of RNTI values.

TABLE 2

| Value (hexadecimal) | RNTI |
|---|---|
| 0000 | N/A |
| 0001-003C | RA-RNTI, C-RNTI, Semi-Persistent Scheduling C-RNTI, Temporary C-RNTI, TPC-PUCCH-RNTI and TPC-PUSCH-RNTI (see note) |
| 003D-FFF3 | C-RNTI, Semi-Persistent Scheduling C-RNTI, Temporary C-RNTI, TPC-PUCCH-RNTI and TPC-PUSCH-RNTI |
| FFF4-FFFC | Reserved for future use |
| FFFD | M-RNTI |
| FFFE | P-RNTI |
| FFFF | SI-RNTI |

If the PDCCH is for a specific UE, a unique identifier (e.g., cell-RNTI (C-RNTI)) of the UE may be masked to the CRC. Alternatively, if the PDCCH is for a paging message, a paging indication identifier (e.g., paging-RNTI (P-RNTI)) may be masked to the CRC. If the PDCCH is for system information, a system information identifier (e.g., system information-RNTI (SI-RNTI)) may be masked to the CRC. To indicate a random access response that is a response for transmission of a random access preamble of the UE, a random access-RNTI (RA-RNTI) may be masked to the CRC.

When the C-RNTI is used, the PDCCH carries control information for a specific UE (such information is called UE-specific control information), and when another RNTI is used, the PDCCH carries common control information received by all or a plurality of UEs in a cell.

The CRC-attached DCI is encoded to generate coded data (step 520). Encoding includes channel encoding and rate matching.

The coded data is modulated to generate modulation symbols (step 530).

The modulation symbols are mapped to physical resource elements (REs) (step 540). The modulation symbols are respectively mapped to the REs.

Figure 7:
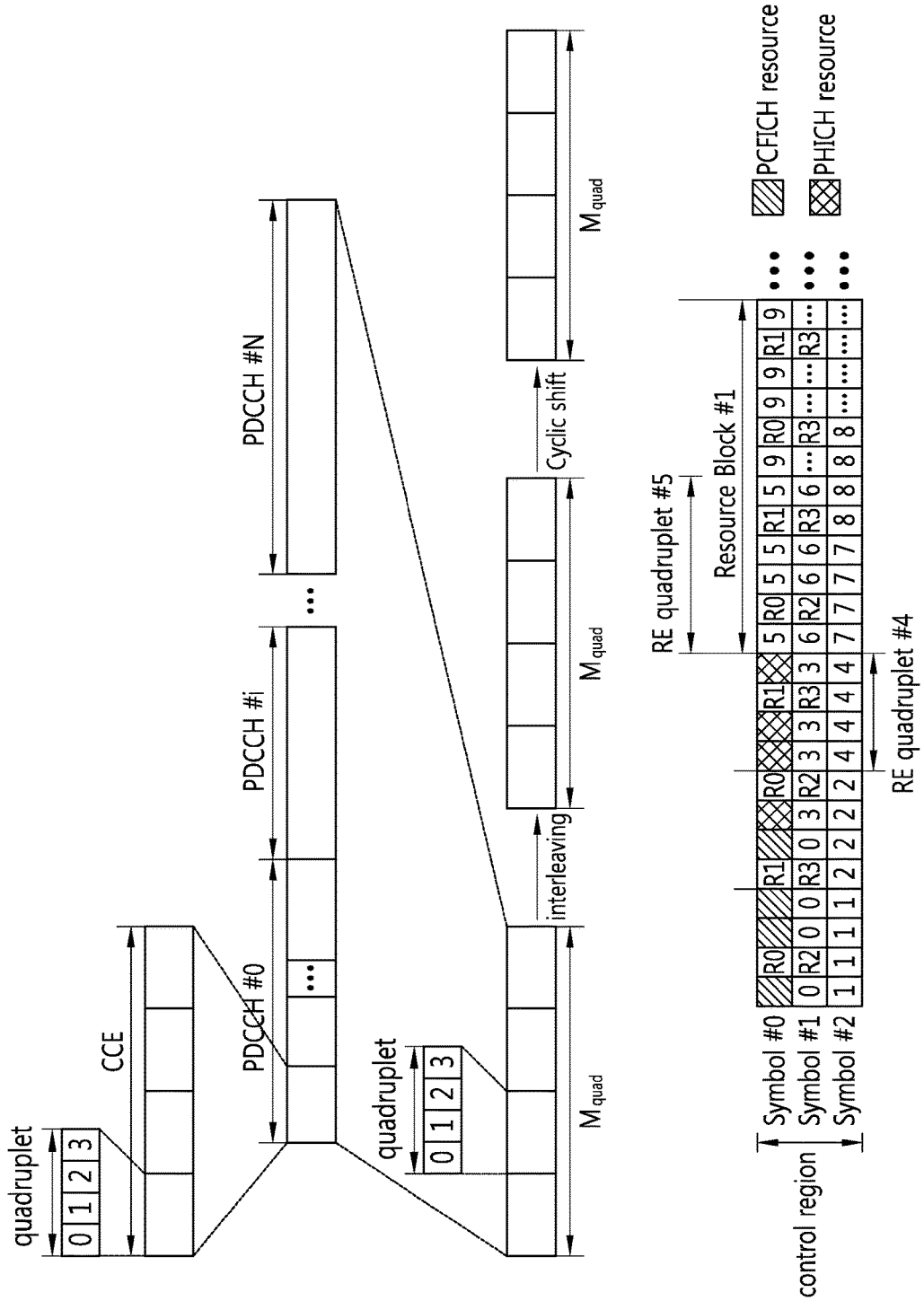
FIG. 7 shows an example of resource mapping of a PDCCH.

FIG. 7 shows an example of resource mapping of a PDCCH.

In FIG. 7, R0 denotes a reference signal of a $1^{st}$ antenna port. R1 denotes a reference signal of a $2^{nd}$ antenna port. R2 denotes a reference signal of a $3^{rd}$ antenna port. R3 denotes a reference signal of a $4^{th}$ antenna port.

A control region in a subframe includes a plurality of control channel elements (CCEs). The CCE is a logical allocation unit used to provide the PDCCH with a coding rate depending on a radio channel state, and corresponds to a plurality of resource element groups (REGs). According to an association relation of the number of CCEs and the coding rate provided by the CCEs, a PDCCH format and the number of available bits of the PDCCH are determined.

One REG (indicated by a quadruplet in the drawing) includes 4 REs. One CCE includes 9 REGs. The number of CCEs used to configure one PDCCH may be selected from a set {1, 2, 4, 8}. Each element of the set {1, 2, 4, 8} is referred to as a CCE aggregation level.

That is, the PDCCH consists of one or more CCEs, performs interleaving in an REG unit, and is mapped to a physical resource after performing cyclic shift based on a cell identifier (ID).

A plurality of PDCCHs can be transmitted in one subframe. A UE monitors a plurality of PDCCHs in every subframe. Monitoring is an operation of attempting PDCCH decoding or detection by the UE according to a PDCCH format.

The 3GPP LTE uses blind decoding for PDCCH detection. The blind decoding is also referred to as blind detection. The blind decoding is a scheme in which a desired identifier is de-masked from a CRC of a received PDCCH (referred to as a candidate PDCCH) to determine whether the PDCCH is its own control channel by performing CRC error checking. The blind decoding is performed since the UE cannot know about a specific position in a control region in which its PDCCH is transmitted and about a specific CCE aggregation or DCI format used for PDCCH transmission.

The 3GPP LTE uses a search space (SS) to reduce an overload caused by the blind decoding. The SS can also be called a monitoring set of a CCE for the PDCCH. The UE monitors the PDCCH in the SS.

Figure 8:
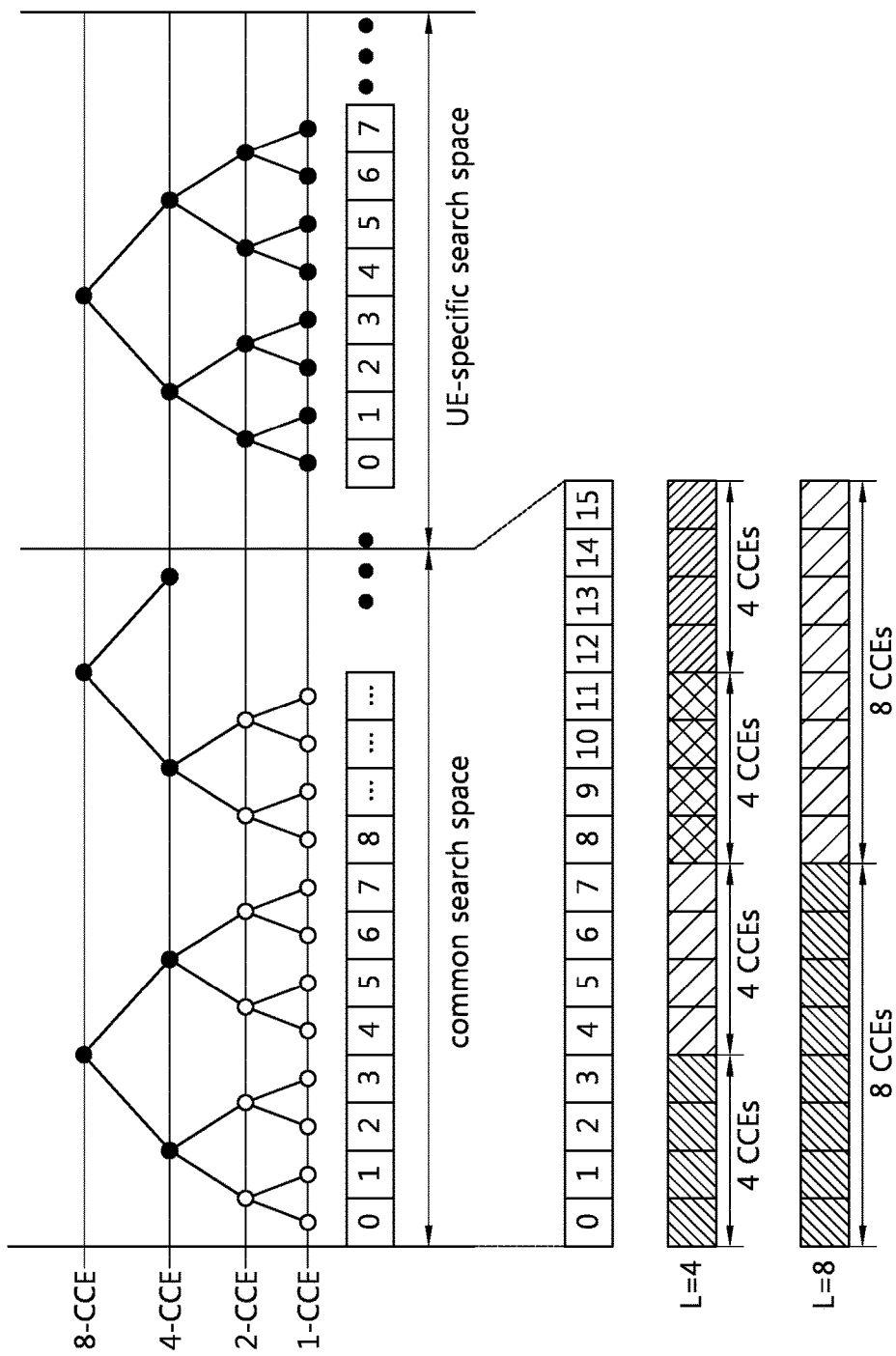
FIG. 8 shows an example of a common search space and a user equipment (UE)-specific search space for monitoring a PDCCH.

FIG. 8 shows an example of a common search space and a UE-specific search space for monitoring a PDCCH.

A search space is classified into a common search space (CSS) and a UE-specific search space (USS). The CSS is a space for searching for a PDCCH having common control information (also referred to as cell-specific control information), and may consist of 16 CCEs indexed with 0 to 15. The CSS supports a PDCCH having a CCE aggregation level of {4, 8}. However, a PDCCH (e.g., DCI formats 0, 1A) for carrying UE-specific information can also be transmitted in the CSS. The USS supports a PDCCH having a CCE aggregation level of {1, 2, 4, 8}.

Now, a signal transmission method in a multi-node system will be described. Although it is described hereinafter that the present invention applies to the multi-node system for example, the present invention is not limited thereto. That is, the present invention may also apply to any wireless communication system other than the multi-node system.

A plurality of BSs having high transmit power and a plurality of nodes having lower transmit power may be deployed in the multi-node system. A new signal transmission method is required to support more UEs by using limited radio resources. In particular, there is a need for a specific method for allocating a control region to transmit a control signal to a UE.

1. Enhanced (E)-Control Region

Figure 9:
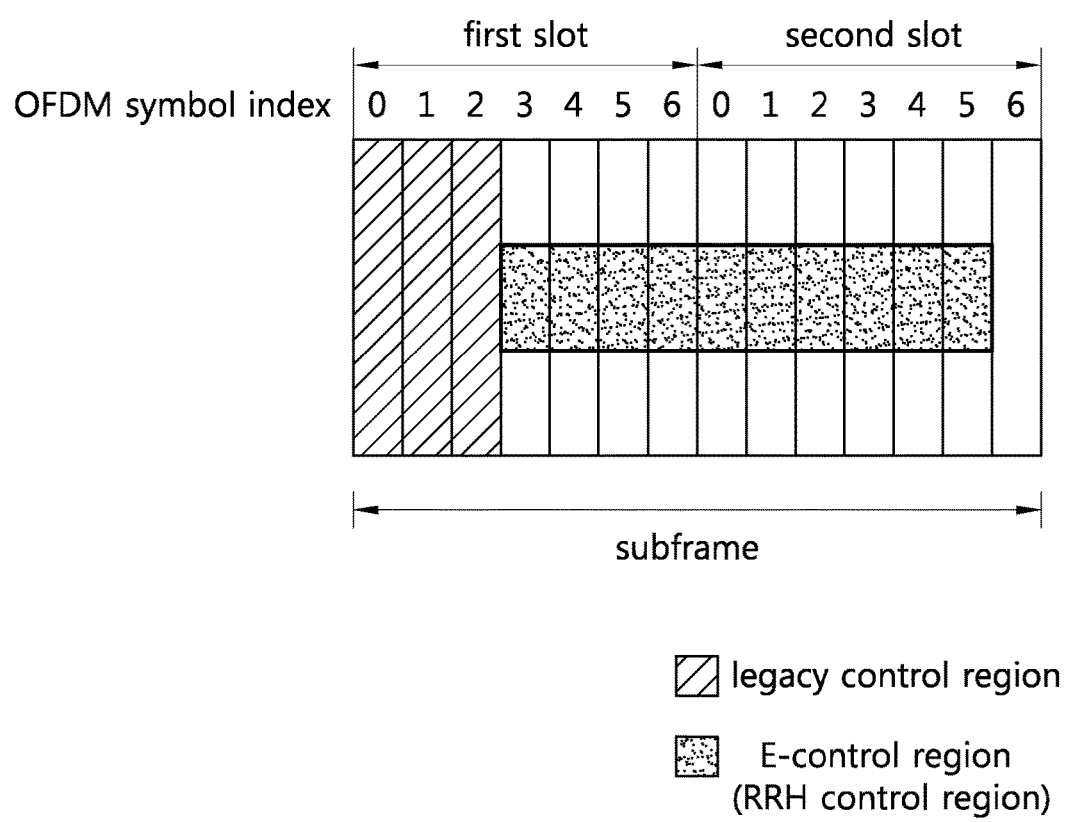
FIG. 9 shows an enhanced (E)-control region to be added according to an embodiment of the present invention.

FIG. 9 shows an E-control region to be added according to an embodiment of the present invention.

Referring to FIG. 9, the E-control region may be located next to a legacy control region in a time domain. For example, if the legacy control region is transmitted in first three OFDM symbols of a subframe, the E-control region may be added to OFDM symbols located next to the three OFDM symbols. From the perspective of a frequency domain, the legacy control region and the E-control region may be configured either identically or differently. In the example of FIG. 9, the E-control region is configured only to some frequency bands of the legacy control region.

Herein, the E-control region may imply a radio resource region capable of transmitting different control information for each node of the multi-node system. In this sense, the E-control region may also be referred to as an 'RRH control region'.

A signal for an advanced UE may be transmitted in the E-control region. The advanced UE implies a UE capable of transmitting and receiving a signal according to the present invention. A legacy UE implies a UE which operates based on the existing communication standard. In other words, the legacy UE may be a first radio access technology (RAT), for example, a first-type UE which operates based on 3GPP LTE Rel-10, and the advanced UE may be a second RAT, for example, a second-type UE which operates based on 3GPP LTE Rel-11. Herein, the second RAT may be evolved from the first RAT.

For example, a control channel for the advanced UE may be transmitted in the E-control region. The control channel for the advanced UE is called an E-control channel to distinguish from a control channel for the legacy UE. Examples of the E-control channel include an E-PDCCH, an E-PCFICH, an E-PHICH, etc. Hereinafter, the PDCCH, the PCFICH, and the PHICH imply the legacy control channel, and the E-PDCCH, the E-PCFICH, the E-PHICH, etc., imply the E-control channel according to the present invention. In addition, an X region implies a radio resource region in which an X channel is transmitted from the perspective of the BS or the node, and implies a radio resource region in which the X channel is received from the perspective of the UE. For example, the E-PDCCH region implies a radio resource region in which the E-PDCCH is transmitted.

In addition, a reference signal (RS) not used by the legacy UE may be used in the E-control region. The advanced UE may receive a signal by using the RS not used by the legacy UE in the E-control region.

From the perspective of an allocated radio resource, the E-control region may be configured equally to an R-PDCCH region used to transmit control information from the BS to a relay station. The R-PDCCH region may be configured for each slot as shown in Table 3 below.

TABLE 3

| Configuration | 'DL-StartSymbol' | End symbol index |
| --- | --- | --- |
| 0 | 1 | 6 |
| 1 | 2 | 6 |
| 2 | 3 | 6 |

TABLE 4

| Configuration | Start symbol index | End symbol index |
| --- | --- | --- |
| 0 | 0 | 6 |
| 1 | 0 | 5 |

Table 3 shows an R-PDCCH configuration for a first slot, and Table 4 shows an R-PDCCH configuration for a second slot. The BS provides a parameter 'DL-StartSymbol' of Table 3 above by using a higher layer signal. If the BS and the relay station transmit a DL subframe which is time-aligned to a subframe boundary, the configuration 1 of Table 4 is used, and otherwise, the configuration 0 of Table 4 is used. That is, an R-PDCCH is configured in the range from an OFDM symbol of the first slot indicated by the parameter 'DL-StartSymbol' to an OFDM symbol #6 or #5 of the second slot. The E-control region may be configured equally to the R-PDCCH region. For example, if no relay station exists in a multi-node system, the same resource region as the R-PDCCH region may be configured as the E-control region.

The E-control region and the R-PDCCH region are different in terms of usages and a control channel for transmission. That is, the R-PDCCH region is used for transmitting control information by the BS to the relay station, and the E-control region is used for transmitting control information by the BS or the node to the UE. The control information transmitted in the E-control region is information to be received ultimately by the UE, and may include cell-specific control information (e.g., system information), UE-specific control information, and node-specific control information.

From the perspective of the control channel, only the R-PDCCH is transmitted in the R-PDCCH region, whereas the E-PDCCH, the E-PCFICH, and the E-PHICH can be transmitted in the E-control region.

2. Presence/Absence of E-Control Region and Signaling of Configuration Information The BS (or node) may report a presence/absence of the E-control region and an allocation location to the UE. For example, the BS may use a CFI value transmitted through a legacy PCFICH to report the presence/absence of the E-control region and/or the allocation location.

Table 5 below shows a CFI index and CFI codeword defined in the existing standard.

TABLE 5

| CFI | CFI codeword <b0, b1, . . . , b31> |
|---|---|
| 1 | <0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1> |
| 2 | <1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0> |
| 3 | <1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1> |
| 4 (Reserved) | <0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0> |

As shown in Table 5 above, a CFI index 4 is a reserved index. The reserved CFI index may be utilized to indicate whether the E-control region exists in a corresponding subframe or to indicate a configuration of the E-control region. The configuration of the E-control region implies a size and location of the E-control region.

For example, if the CFI index is 4, it may indicate that the number of OFDM symbols of the PDCCH region is 3 and that the E-control region exists. The UE may know that the E-control region exists if the CFI index 4 is received through the PCFICH. In addition, it may also be known that the PDCCH exists in three OFDM symbols of a subframe, and the E-control region is located at up to a last OFDM symbol or a second last OFDM symbol of the subframe, after the three OFDM symbols. Herein, the number of OFDM symbols of the PDCCH is 3 for exemplary purposes only.

If the CFI index is 4, the legacy UEs may not recognize this, which may cause an erroneous operation. Therefore, it can be restricted to be used only in a resource region not used by the legacy UE, for example, only in a carrier not accessible by the legacy UE.

3. Search Space of E-PDCCH Region and Control Information to be Transmitted.

The E-PDCCH region is a radio resource region in which the E-PDCCH is transmitted in the E-control region. The legacy PDCCH region may be divided into a common search space and a UE-specific search space. However, the E-PDCCH region may consist of only a UE-specific search space for an advanced UE.

As such, if only the UE-specific search space for the advanced UE exists in the E-PDCCH region, there is a need to consider a method of transmitting UE-specific control information and cell-specific control information (e.g., system information or E-control region's configuration information, etc.) for the advanced UE. This will be described below.

Table 6 below shows an example of transmitting control information to the advanced UE.

TABLE 6

| PDCCH region | | E-PDCCH region |
|---|---|---|
| common search space | UE-specific search space | UE-specific search space |
| cell-specific control information, UE-specific control information | UE-specific control information | UE-specific control information |

Referring to Table 6, the BS or the node does not transmit cell-specific control information commonly applied to the legacy UE and the advanced UE in the E-PDCCH region. The cell-specific control information for the advanced UE is transmitted in a common search space of the legacy PDCCH region. Therefore, the advanced UE searches for the cell-specific control information to be received only in the common search space of the PDCCH region by using SI-RNTI, P-RNTI, M-RNTI, RA-RNTI, TPC-PUCCH-RNTI, and TPC-PUSCH-RNTI. In addition, the UE-specific control information for the advanced UE may be transmitted both in the legacy PDCCH region and the E-PDCCH region.

If the UE-specific control information for the advanced UE is transmitted only through the E-PDCCH region, resource allocation information for receiving the E-PDCCH must be transmitted using the cell-specific control information. However, information on a reference signal which must be known to receive the E-PDCCH may differ depending on a node to which the UE belongs. Therefore, the UE must preferentially receive node information indicating the node to which the UE belongs before receiving the E-PDCCH. Preferably, the node information uses the legacy PDCCH.

If a multi-node system consists of a high-power node (e.g., BS) in a center portion and a plurality of low-power nodes (e.g., RRH) arranged in a distributed manner, only the high-power node can transmit CRS and a PDCCH for the legacy UE. In addition, the low-power nodes are to transmit the E-PDCCH, and may have a region in which the E-PDCCH is not received according to a location of the UE. Therefore, the UE-specific control information for the advanced UE is preferably transmitted not only through the E-PDCCH region but also through the legacy PDCCH region.

That is, the UE-specific search space of the advanced UE may include the legacy PDCCH region and the E-PDCCH region. If the total number of CCEs of the legacy PDCCH region is $N_{CCE,1}$ and the total number of CCEs of the E-PDCCH region is $N_{CCE,2}$, then the total number $N_{CCE}$ of CCEs defining a full search space is $N_{CCE,1}$ in case of the legacy UE, and is $N_{CCE,1}+N_{CCE,2}$ in case of the advanced UE.

If the UE-specific search space is increased in the search space, there is a problem in that a complexity for finding the UE-specific control information is increased. Therefore, it is effective to transmit, in a UE-specific manner, search space indication information which reports a region, i.e., either the legacy PDCCH region or the E-PDCCH region, in which the UE-specific control information of the advanced UE is delivered. By using the search space indication information, it can be reported whether the UE-specific search space for the advanced UE exists in the legacy PDCCH region or the E-PDCCH region. If the search space indication information indicates that the UE-specific search space for the advanced UE exists in the legacy PDCCH region, a size of the search space is $N_{CCE,1}$. Alternatively, if the search space indication information indicates that the UE-specific search space for the advanced UE is the E-PDCCH region, the size of the search space is $N_{CCE,2}$. Therefore, the total number of CCEs of the UE-specific search space may vary depending on the search space indication information.

The search space indication information may be transmitted in various manners. That is, any one of the following methods can be selected as a method of changing the UE-specific search space from the PDCCH region to the E-PDCCH region according to the search space indication information for the advanced UE.

1) Higher Layer Signaling.

Figure 10:
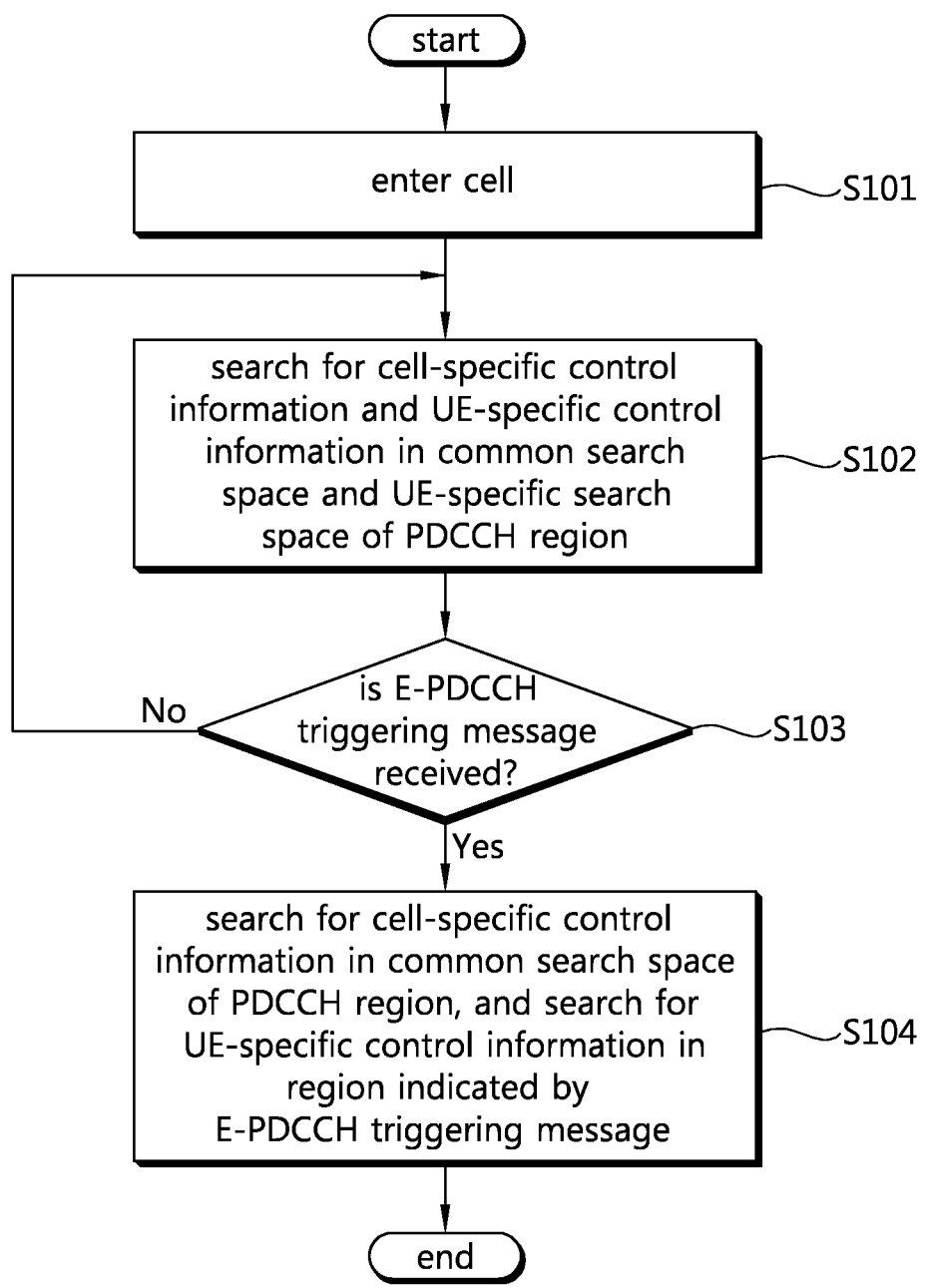
FIG. 10 shows an example of reporting a UE-specific search space to a UE by using a higher layer signal.

FIG. 10 shows an example of reporting a UE-specific search space to a UE by using a higher layer signal. That is, search space indication information is transmitted using the higher layer signal in this example.

Referring to FIG. 10, the UE enters inside a cell (step S101). The UE searches for cell-specific control information and UE-specific control information in a common search space and a UE-specific search space of a PDCCH region (step S102).

If an E-PDCCH triggering message is received (step S103), the UE searches for the cell-specific control information in the common search space of the PDCCH region, and searches for the UE-specific control information in a region indicated by the E-PDCCH triggering message (step S104). Herein, the E-PDCCH triggering message is search space indication information transmitted to a higher layer.

2) Implicit Signaling from Node Allocation.

In this method, when a BS allocates a specific node to a UE, starting from that time, the UE searches for UE-specific control information in an E-PDCCH region corresponding to the specific node. A method of allocating a node to the UE in a multi-node system may be, for example, a method of reporting, to the UE, virtual cell's reference signal information to be received. Herein, the reference signal information may be information for reporting a cell ID of a virtual cell, a CSI-RS port number, a CSI-RS configuration, a CSI-RS subframe configuration, etc. The virtual cell implies a cell which is recognized by the legacy UE as the same cell as a mother cell but is recognized by the advanced UE as a cell other than the mother cell. The virtual cell may cover some of regions covered by the mother cell. Herein, the mother cell is a cell which is used as a criterion of an operation such as handover, cell selection/reselection, etc. In the multi-node system, the BS may be the mother cell, and the node may be the virtual cell. For example, the node may transmit a synchronization signal by using the same cell ID as the BS and transmit a UE-specific signal by using a cell ID different from the cell ID of the BS. In this case, the legacy UE recognizes the node as the same cell as the BS, but the advanced UE may recognize the node as a cell different from the BS. In this case, the node may be called the virtual cell.

Upon receiving reference signal information, the UE may know that it is allocated not to the mother cell but to the virtual cell. Therefore, after receiving the reference signal information, the UE searches for UE-specific control information not in a PDCCH region but in an E-PDCCH region. Configuration information of each node's E-PDCCH may be broadcast as cell-specific control information, or may be provided to the UE as UE-specific control information by using DCI or a higher layer message.

3) Implicit Signaling from E-PDCCH Configuration Information.

A BS may provide E-PDCCH configuration information to a UE through a PDCCH region. From the perspective of the UE, if the E-PDCCH confirmation information is included in cell-specific control information or UE-specific control information received in the PDCCH region, it may imply that UE-specific control information which appears thereafter is transmitted in the E-PDCCH region. If the E-PDCCH configuration information is reported as the cell-specific control information, a new RNTI such as an E-RNTI can be defined and then can be subjected to CRC masking.

4) Explicit Physical Layer Signaling Using PDCCH.

ABS may report to a UE whether an E-PDCCH is received through the PDCCH. This method differs from the aforementioned method 3) in a sense that explicit signaling is included while the PDCCH region is used to report whether the E-PDCCH exists. For example, search space indication information which explicitly indicates whether control information is received in the E-PDCCH region or in the PDCCH region may be included in DCI when transmitted. Thereafter, the UE searches for control information through the E-PDCCH or PDCCH region according to the search space indication information included in the DCI.

The aforementioned methods 1) to 4) are methods for reporting to the UE a region, i.e., either the PDCCH region or the E-PDCCH region, in which UE-specific control information is received through implicit or explicit signaling. These methods can be replaced by other methods described below.

4. Method of Broadcasting UE List to Receive Control Information Through E-PDCCH Region.

In this method, a BS periodically or non-periodically broadcasts a UE list to receive control information in an E-PDCCH region.

Figure 11:
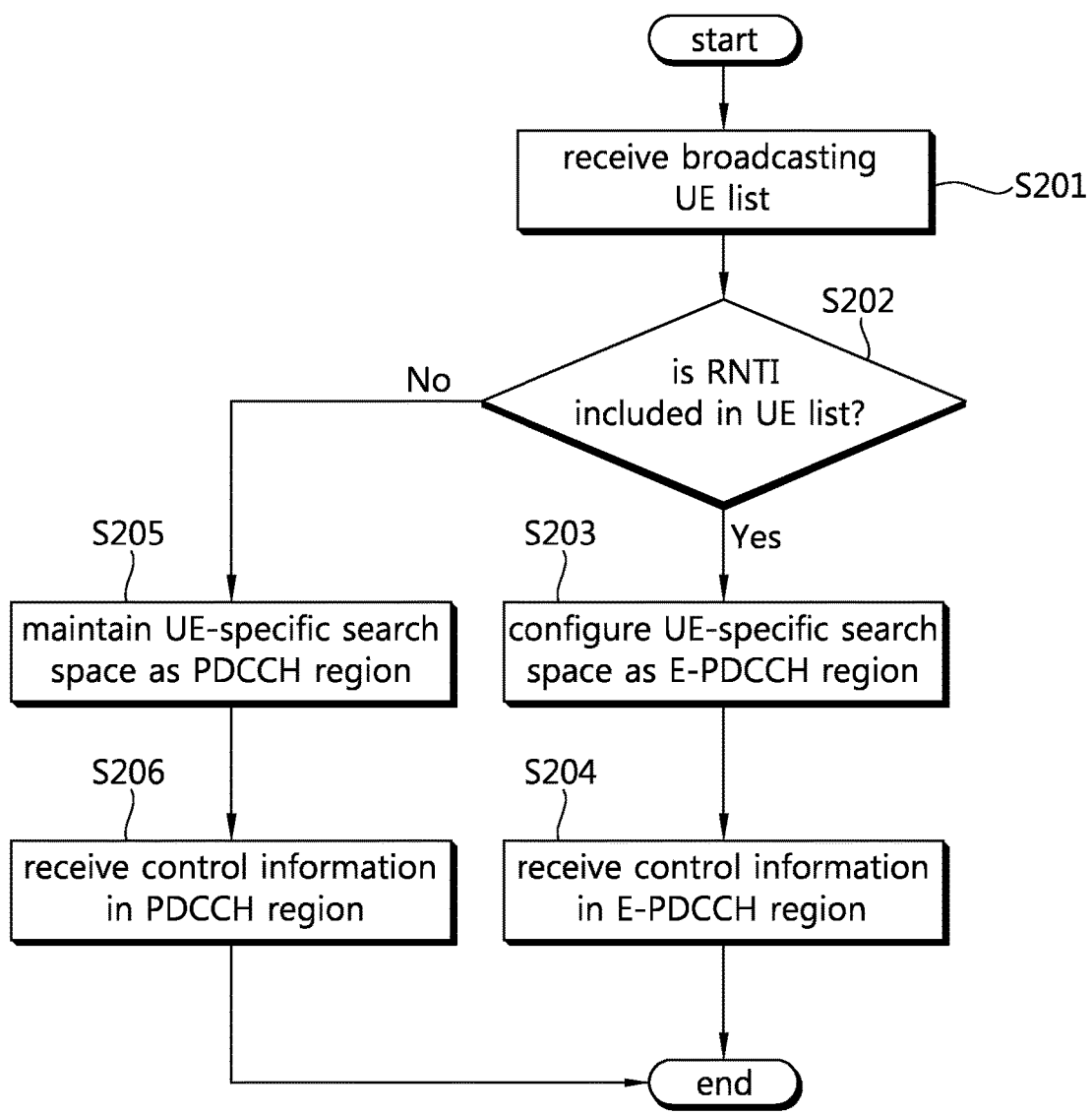
FIG. 11 shows a process of operating a UE when a base station (BS) broadcasts a UE list.

FIG. 11 shows a process of operating a UE when a BS broadcasts a UE list.

Referring to FIG. 11, the UE receives the UE list which is broadcast (step S201). The method of broadcasting the UE list by the BS may use any one of four methods described below or a combination of two or more of them.

Herein, the UE list may include information indicating an E-PDCCH region of each node (e.g., an E-PDCCH's location, size, reference signal information to be applied, etc.) and/or RNTI (e.g., C-RNTI, SPS C-RNTI, temporary C-RNTI, etc.) of the UE for receiving control information in the E-PDCCH region.

The UE determines whether its own RNTI is included in the UE list (step S202), and if included, configures a UE-specific search space which appears thereafter as the E-PDCCH region (step S203). Thereafter, the UE receives control information in the E-PDCCH region (step S204). If its own RNTI is not included in the UE list, the UE maintains the UE-specific search space as a PDCCH region (step S205), and receives the control information in the PDCCH region (step S206).

Now, a method of broadcasting a UE list by a BS will be described.

The BS may transmit the UE list by using cell-specific control information or UE-specific control information through a higher layer, or may transmit the UE list through a physical layer such as a physical broadcast channel (PBCH), a PDCCH, an E-PDCCH, etc. In addition, it can be transmitted through a new channel for transmitting the UE list.

1) The PBCH is transmitted in first four OFDM symbols of a second slot in a first subframe of a radio frame. The PBCH carries system information required by the UE to communicate with the BS or the node. The system information transmitted through the PBCH is called a master information block (MIB). The BS may transmit the UE list by inserting the UE list to the MIB.

2) If the BS transmits the UE list through the PDCCH, the UE list can be transmitted through a common search space of the PDCCH.

3 The BS may allow the common search space to be present in the E-PDCCH and transmit the UE list in the common search space. Although the common search space is not present in the E-PDCCH region in Table 6 above, the present embodiment differs in that the common search space is included in the E-PDCCH region. If the common search space is included in the E-PCCCH region, cell-specific control information shared with the legacy UE may be transmitted through the PDCCH region, and node-related common information (e.g., per-node reference signal configuration information, per-node antenna port information, etc.) including the UE list may be transmitted in the common search space of the E-PDCCH region.

Some of SI-RNTI, P-RNTI, M-RNTI, RA-RNTI, TPC-PUCCH-RNTI, and TPC-PUSCH-RNTI which are used in the common search space of the PDCCH region may not be used in the common search space of the E-PDCCH region. For example, the SI-RNTI for transmitting system information, the P-RNTI for reporting paging information delivery or system information change, and the M-RNTI for reporting MCCH information change are not used in the common search space of the E-PDCCH.

On the other hand, since uplink power control information of an advanced UE is information that can be delivered for each node, the TPC-PUCCH-RNTI and the TPC-PUSCH-RNTI can be used in the common search space of the E-PDCCH region. In addition, the RA-RNTI used to deliver a random access response may also be used in the common search space of the E-PDCCH. The RA-RNTI may be used when the BS transmits timing advance information for uplink transmission for each UE. The timing advance information may be determined in a receiving node of each UE. Therefore, the timing advance information is node-specific control information, and may be used in the common search space of the E-PDCCH region.

In addition, a new RNTI may be defined, so that the UE list can be transmitted through the common search space of the PDCCH region or the common search space of the E-PDCCH region by using the new RNTI. For convenience, the new RNTI is called a User equipment List notification (UL)-RNTI. Then, the UL-RNTI may use the reserved value in Table 2 above, that is, one of values ranges from FFF4 to FFFC.

In addition, the UL-RNTI may be defined to be used only in the common search space of the PDCCH region or the E-PDCCH region. Then, all UEs may confirm the UE list, which is to be received in the E-PCCH region, in the common search space of the PDCCH region or the E-PDCCH region by using the UL-RNTI. The UL-RNTI may be defined to be used only in a common search space which exists in the E-PDCH region.

4) The BS may add a new channel for delivering the UE list to receive the E-PDCCH, and may transmit the UE list through the new channel. For convenience, the new channel is called an E-PULICH (physical user equipment list indicator channel). The E-PULICH may be transmitted together with the E-PDCCH and the E-PHICH in the R-PDCCH region.

In the R-PDCCH region, the E-PULICH may use a fixed CCE in first one to three symbol durations of a corresponding subframe. That is, the E-PULICH may be transmitted by using not dynamic resource allocation but a pre-fixed resource. The E-PULICH may also be used to transmit cell-specific control information in addition to the UE list.

Figure 12:
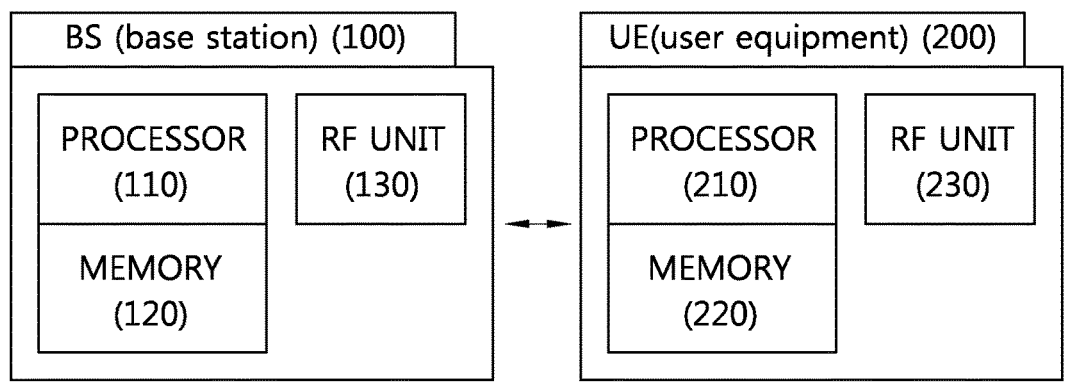
FIG. 12 is a block diagram showing a BS and a UE.

FIG. 12 is a block diagram showing a BS and a UE.

A BS 100 includes a processor 110, a memory 120, and a radio frequency (RF) unit 130. The processor 110 implements the proposed functions, procedures, and/or methods. For example, the processor 110 transmits search space indication information to a UE. In addition, the processor 110 may broadcast a UE list. The memory 120 is coupled to the processor 110, and stores a variety of information for driving the processor 110. The RF unit 130 is coupled to the processor 110, and transmits and/or receives a radio signal.

A UE 200 includes a processor 210, a memory 220, and an RF unit 230. The processor 210 implies the proposed functions, procedures, and/or methods. For example, the processor 210 receives search space indication information and determines a search space for searching for control information. In addition, the processor 210 may change a UE-specific search space to an E-PDCCH region by comparing an RNTI of a UE list with its own RNTI. The memory 220 is coupled to the processor 210, and stores a variety of information for driving the processor 210. The RF unit 230 is coupled to the processor 210, and transmits and/or receives a radio signal.

The processors 110 and 210 may include an application-specific integrated circuit (ASIC), a separate chipset, a logic circuit, a data processing unit, and/or a converter for mutually converting a baseband signal and a radio signal. The memories 120 and 220 may include a read-only memory (ROM), a random access memory (RAM), a flash memory, a memory card, a storage medium, and/or other equivalent storage devices. The RF units 130 and 230 may include one or more antennas for transmitting and/or receiving a radio signal. When the embodiment of the present invention is implemented in software, the aforementioned methods can be implemented with a module (i.e., process, function, etc.) for performing the aforementioned functions. The module may be stored in the memories 120 and 220 and may be performed by the processors 110 and 210. The memories 120 and 220 may be located inside or outside the processors 110 and 210, and may be coupled to the processors 110 and 210 by using various well-known means.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

The invention claimed is:

1. A method for monitoring control information in a wireless communication system, the method performed by an advanced user equipment (UE) and comprising:
   receiving a higher layer signal indicating a subframes in which the advanced UE has to monitor an enhanced physical downlink control channel (EPDCCH);
   in a first subframe which is not indicated by the higher layer signal, monitoring a common search space for the advanced UE and a physical downlink control channel (PDCCH) UE-specific search space,
   wherein the common search space for the advanced UE is same as a common search space for a legacy UE; and
   in a second subframe which is indicated by the higher layer signal, monitoring a common search space for the advanced UE and an EPDCCH UE-specific search space,
   wherein, in a time domain, the common search space for the advanced UE and the PDCCH UE-specific search space are located in first N orthogonal frequency division multiplexing (OFDM) symbols, where N indicates a number of OFDM symbols constituting a PDCCH of a subframe, N is a natural number and 1≤N≤4,
   wherein, in the time domain, the EPDCCH UE-specific search space is located in at least one OFDM symbol after the N OFDM symbols in the subframe, and
   wherein the advanced UE receives a signal in the EPDCCH UE-specific search space using a reference signal which is not used by the legacy UE in the PDCCH UE-specific search space.

2. The method of claim 1, wherein the advanced UE monitors the common search space for the advanced UE using at least one of control channel element (CCE) aggregation level 4 and CCE aggregation level 8.

3. An advanced user equipment (UE) monitoring control information in a wireless communication system, the advanced UE comprising:
   a radio frequency (RF) unit configured to transmit and receive a radio signal; and
   a processor coupled with the RF unit and configured to:
     receive a higher layer signal indicating a subframes in which the advanced UE has to monitor an enhanced physical downlink control channel (EPDCCH),
     in a first subframe which is not indicated by the higher layer signal, monitor a common search space for the advanced UE and a physical downlink control channel (PDCCH) UE-specific search space,
     wherein the common search space for the advanced UE is same as a common search space for a legacy UE, and
     in a second subframe which is indicated by the higher layer signal, monitor a common search space for the advanced UE and an EPDCCH UE-specific search space,
     wherein, in a time domain, the common search space for the advanced UE and the PDCCH UE-specific search space are located in first N orthogonal frequency division multiplexing (OFDM) symbols, where N indicates a number of OFDM symbols constituting a PDCCH of a subframe, N is a natural number and 1≤N≤4,
     wherein, in the time domain, the EPDCCH UE-specific search space is located in at least one OFDM symbol after the N OFDM symbols in the subframe, and
   wherein the advanced UE receives a signal in the EPDCCH UE-specific search space using a reference signal which is not used by the legacy UE in the PDCCH UE-specific search space.

4. The advanced UE of claim 3, wherein the advanced UE monitors the common search space for the advanced UE using at least one of control channel element (CCE) aggregation level 4 and CCE aggregation level 8.

* * * * *